United States Patent
Huang et al.

(10) Patent No.: US 9,098,308 B2
(45) Date of Patent: Aug. 4, 2015

(54) METHOD AND APPARATUS FOR CODE PERFORMANCE ANALYSIS BASED ON EXECUTION TRACE INFORMATION

(71) Applicant: Marvell World Trade Ltd., St. Michael (BB)

(72) Inventors: Haitao Huang, Shanghai (CN); Ningsheng Jian, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 1 day.

(21) Appl. No.: 13/926,525

(22) Filed: Jun. 25, 2013

(65) Prior Publication Data

US 2013/0346952 A1 Dec. 26, 2013

Related U.S. Application Data

(60) Provisional application No. 61/664,427, filed on Jun. 26, 2012.

(51) Int. Cl.
| | |
|---|---|
| *G06F 9/44* | (2006.01) |
| *G06F 9/45* | (2006.01) |
| *G06F 11/34* | (2006.01) |
| *G06F 11/36* | (2006.01) |
| *G06F 9/455* | (2006.01) |

(52) U.S. Cl.
CPC ............ *G06F 8/443* (2013.01); *G06F 9/45516* (2013.01); *G06F 11/3409* (2013.01); *G06F 11/3471* (2013.01); *G06F 11/3612* (2013.01); *G06F 11/3636* (2013.01); *G06F 2201/81* (2013.01); *G06F 2201/815* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 6,311,325 | B1 * | 10/2001 | Levine et al. ................. | 717/128 |
| 7,086,064 | B1 * | 8/2006 | Stevens .......................... | 719/310 |
| 7,941,787 | B2 * | 5/2011 | Watanabe ...................... | 717/124 |
| 8,356,286 | B2 * | 1/2013 | Schmelter et al. ............. | 717/128 |
| 8,381,194 | B2 * | 2/2013 | Wang ............................. | 717/131 |
| 8,490,073 | B2 * | 7/2013 | Mitran .......................... | 717/158 |
| 8,667,471 | B2 * | 3/2014 | Wintergerst et al. .......... | 717/130 |
| 2002/0147969 | A1 * | 10/2002 | Lethin et al. .................. | 717/138 |
| 2006/0101416 | A1 * | 5/2006 | Callahan et al. .............. | 717/128 |
| 2007/0006159 | A1 * | 1/2007 | Hecht et al. ................... | 717/124 |

* cited by examiner

Primary Examiner — Don Wong
Assistant Examiner — Devayani R Talukdar

(57) ABSTRACT

Aspects of the disclosure provide a method for profiling. The method includes collecting symbol information to map traces of codes in a program to memory addresses storing corresponding native codes that are dynamically compiled from the traces of codes during an execution of the program, and making the symbol information available after the dynamic compilation to analyze profiling data sampled during the execution of the program.

20 Claims, 4 Drawing Sheets

```
#ifndef JIT_DUMP_SHARE
#define JIT_DUMP_SHARE

/*
*Jit Symbol information
*
*length – strlen(JitSymbol.name), '\0' of JitSymbol.name is also
commit to file
*isGlobal == 1 means the symbol is a trace name
*           == 0 means the symbol is a bytecode
*/
typedef struct SymbolInfo { u4  addr;
    u2  length;
    u2  size;
    u1  isGlobal;   // 1:local  0:global
    u1  arm;        // 1:arm    0:thumb } SymbolInfo;

/*
*Jit Symbol
*
*symbol name
*     global symbol follow the rule: class;method offset length
*           example: Lcom/android/cm3/LoopAtom;execute 0x31 21
*     local symbol
*           example: add-int/lit8 v0, v0, (#1)
*/
typedef struct JitSymbol {
    SymbolInfo info;
    char*   name;
} JitSymbol;
    typedef struct JitHeader {
      char    magic[12];    /* should be "jitdumpfile",
including '\0' */ u4    symCount;
      u4    symTabOffset;
      u4    codeSize;
      u4    codeOffset;
      u4    codeAddr;       /* run time address */
      u4    checksum;       /* reserved */
} JitHeader;

#endif/*JIT_DUMP_FILE*/
```

FIG. 4

METHOD AND APPARATUS FOR CODE PERFORMANCE ANALYSIS BASED ON EXECUTION TRACE INFORMATION

INCORPORATION BY REFERENCE

This present disclosure claims the benefit of U.S. Provisional Application No. 61/664,427, "JIT CODE PERFORMANCE ANALYSIS" filed on Jun. 26, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, profiling tools can be used to conduct performance analysis in a computer system. In an example, a computer system is periodically interrupted, and a profiling tool samples various parameters in the computer system during interrupt routines. The sampled data can be collected to profile the computer system, and to statistically analyze the performance of the computer system.

SUMMARY

Aspects of the disclosure provide a method for profiling. The method includes collecting symbol information to map traces of codes in a program to memory addresses storing corresponding native codes that are dynamically compiled from the traces of codes during an execution of the program, and making the symbol information available after the execution of the program to analyze profiling data sampled during the execution of the program.

To collect the symbol information, in an embodiment, the method includes collecting the symbol information to map the traces of codes in the program to the memory addresses storing the corresponding native codes that are dynamically compiled from the traces of codes during the execution of the program by a virtual machine.

According to an aspect of the disclosure, the method includes detecting that a number of execution for a trace of codes in the program is more than a threshold, compiling the trace of codes into native codes, storing the native codes at an address in a cache, and generating a symbol to map the trace to the address. Further, the method includes executing the native codes in the cache when the number of execution is larger than the threshold, and executing the trace of codes by interpretation when the number of execution for the trace is equal or less than the threshold.

To make the symbol information available after the dynamic compilation, the method includes generating a file to include the symbol information before the execution of the program terminates. Further, the method includes providing the file to a profiler that analyzes the profiling data sampled during the execution of the program.

Aspects of the disclosure provide an apparatus that includes a memory and a processor. The memory is configured to store software instructions for a virtual machine. The processor is configured to execute the software instructions to: start a virtual machine to execute a program, collect symbol information to map traces of codes in the program to memory addresses storing corresponding native codes that are dynamically compiled from the traces of codes during the execution of the program, and make the symbol information available after the execution of the program to analyze profiling data sampled during the execution of the program.

Aspects of the disclosure also provide a computer readable medium storing program instructions for causing a processor to execute operations. The operations includes collecting symbol information to map traces of codes in a program to memory addresses storing corresponding native codes that are dynamically compiled from the traces of codes during an execution of the program, and making the symbol information available after the execution of the program to analyze profiling data sampled during the execution of the program.

BRIEF DESCRIPTION OF THE DRAWINGS

Various embodiments of this disclosure that are proposed as examples will be described in detail with reference to the following figures, wherein like numerals reference like elements, and wherein:

FIG. 4 shows an example of a file header according to an embodiment of the disclosure.

DETAILED DESCRIPTION OF EMBODIMENTS

Figure 1:
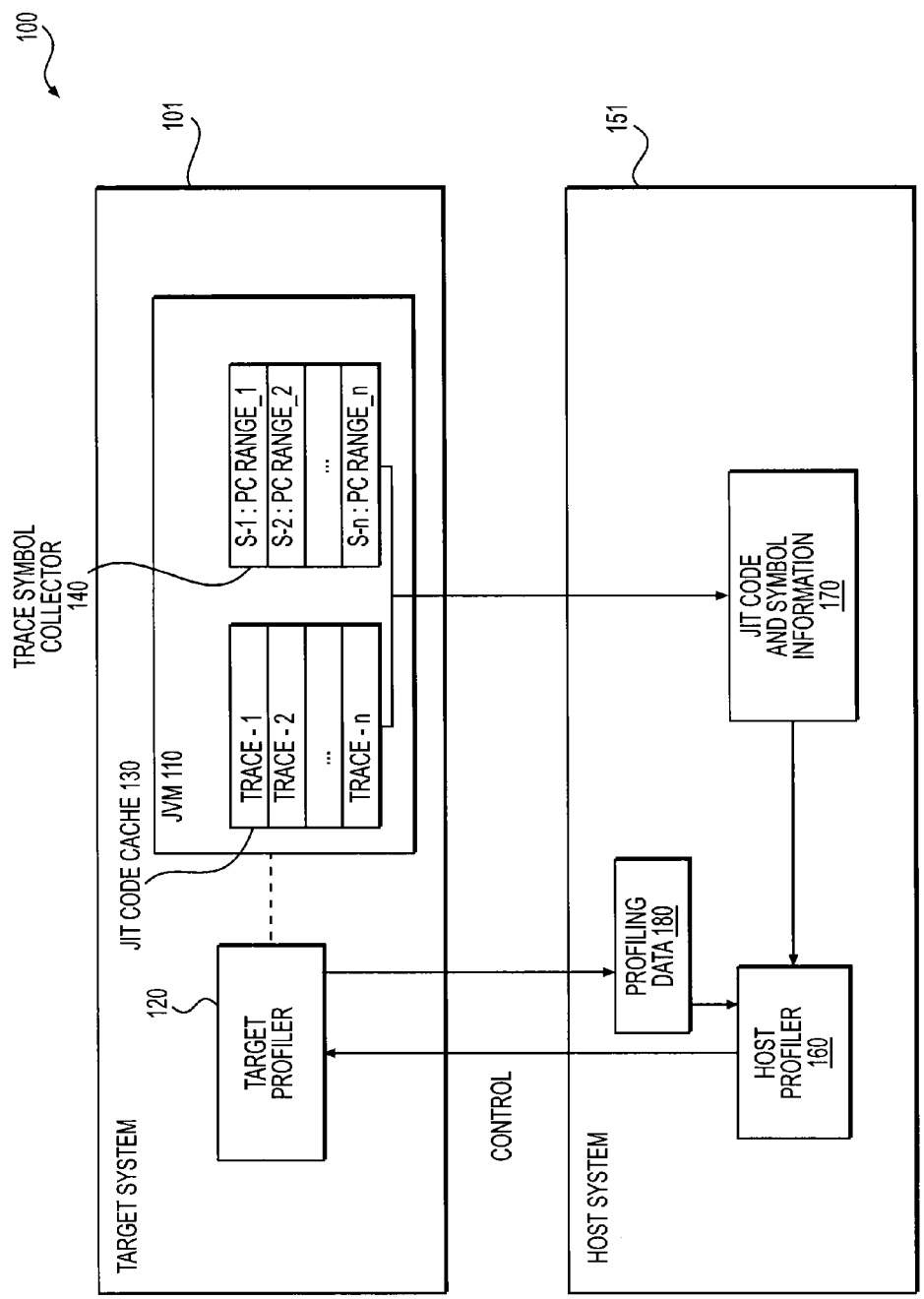
FIG. 1 shows a code performance analysis model 100 according to an embodiment of the disclosure.

FIG. 1 shows a performance analysis model 100 according to an embodiment of the disclosure. The performance analysis model 100 includes a target system 101 and a host system 151. The host system 151 causes a statistical profiling of the target system 101 during operation, and conducts performance analysis based on the statistical profiling.

The target system 101 can be any suitable system that includes a processor to execute software instructions. In an embodiment, the target system 101 is an electronic device, such as a mobile phone, a tablet, a multimedia player, a pocket calculator, a personal digital assistant (PDA), and the like. The processor in the target system 101 can have any suitable architecture, such as a reduced instruction set computing (RISC) architecture, a complex instruction set computing (CISC) architecture, and the like. In an example, the target system 101 is a mobile phone having an advanced RISC machine (ARM) type processor.

The host system 151 can be any suitable system that controls a statistical profiling of the target system 101, and conducts a performance analysis based on the statistical profiling. In an example, the host system 151 is a personal computer, such as a personal computer having an x86 type processor. The host system 151 provides a user interface to receive control instructions from a user. In response to the control instructions, the host system 151 controls the statistical profiling on the target system 101 and conducts the performance analysis based on the statistical profiling.

According to an aspect of the disclosure, the target system 101 uses a virtual machine technique for certain software language. In the FIG. 1 example, the target system 100 is configured to use a Java virtual machine (JVM) 110 (e.g., Dalvik for Android operating system) to provide a run-time environment in which Java bytecodes can be executed. Additionally, the Java virtual machine 110 is configured to enable code cache performance analysis. The code cache performance analysis can be used to analyze and improve virtual machine performance and system performance.

In an example, a source program is generated in a source software language, such as in C language, in Java language, and the like. The source program is compiled to generate Java bytecodes corresponding to the source program. To execute the Java bytecodes, the target system 101 starts the Java virtual machine 110 to provide the run-time environment for the Java bytecodes. After the execution of the Java bytecodes, the Java virtual machine 110 is terminated.

According to an aspect of the disclosure, the Java virtual machine 110 uses interpretation and just-in-time (JIT) compilation for Java bytecode execution. In an example, the Java virtual machine 110 detects frequently executed traces, such as paths, loops, and the like, in the Java bytecodes, and executes the frequently executed traces in a different manner from the less frequently executed traces. For example, the Java virtual machine 110 tracks a number of executions for a trace. When the number of executions for the trace is less than a threshold (e.g., two), the Java virtual machine 110 executes the trace by interpretation; and when the number of executions for the trace is equal or larger than the threshold, the Java virtual machine 110 uses the JIT compilation to compile the trace of bytecodes into a trace of native codes, and caches the trace of native codes in memory. Then, for further executions of the trace, the Java virtual machine 110 can execute the cached native codes.

Generally, a processor or a virtual machine can achieve a higher performance by executing the native codes. Thus, JIT compilation of the frequently executed traces improves virtual machine and system performance.

In the FIG. 1 example, the Java virtual machine 110 includes a JIT code cache 130 to store the frequently executed native codes. According to an aspect of the disclosure, a memory space is allocated for the JIT code cache 130 at the time the Java virtual machine 110 is initiated to execute Java bytecodes of a program. During the execution of the Java bytecodes, hot traces (the frequently executed traces) in the Java bytecodes are detected and compiled into native codes. The native codes corresponding to the hot traces are stored sequentially for example, in the JIT code cache 130. In an embodiment, when the Java virtual machine 110 is terminated at the end of the execution, the JIT code cache 130 is dis-allocated, and the memory space for the JIT code cache 130 is freed.

In an embodiment, what happens in the JIT code cache 130 during operation affects and indicates the performance of the Java virtual machine 110 and the target system 101. Thus, profiling of the JIT code cache 130 assists performance analyses for the Java virtual machine 110 and the target system 101. However, in an embodiment, the JIT code cache 130 is dynamically created and terminated with the Java virtual machine 110, parameters of the JIT code cache 130 may be dynamically changed from execution to execution. For example, the memory space for the JIT code cache 130 may be allocated differently each time of the program execution. In another example, the sequence of hot traces cached in the JIT code cache 130 may be different each time of the program execution.

According to an aspect of the disclosure, the Java virtual machine 110 is configured to collect information that characterizes the dynamic changes in each program execution, and make the collected information available out of the Java virtual machine 110 to assist performance analysis that can be conducted after the Java virtual machine 110 is terminated. In the FIG. 1 example, the Java virtual machine 110 includes a trace symbol collector 140 to collect symbol information for JIT code cache 130 that may be dynamically changed in each program execution. The symbol information denotes a mapping of hot traces to memory addresses in the JIT code cache 130 that store native codes for the hot traces during operation. In an example, when a first hot trace of Java bytecodes is detected, the trace is compiled into a trace of native nodes, and the trace of native codes is stored in the JIT code cache 130 as shown by TRACE-1 in FIG. 1. Then, in an example, the trace symbol collector 140 collects a symbol for the first hot trace. For example, the symbol includes a name "S-1", and a program counter (PC) range (e.g., PC RANGE_1) that points to the memory space in the JIT code cache 130 that stores TRACE-1.

Similarly, when more hot traces are detected, the hot traces are compiled into native codes and the native codes are stored in the JIT code cache 130. The trace symbol collector 140 collects the symbols for the hot traces. The symbols provide a mapping of the hot traces with the memory spaces in the JIT code cache 130 that store the native codes compiled from the hot traces.

According to an aspect of the disclosure, the Java virtual machine 110 makes the symbol information available after the Java virtual machine 110 is terminated to assist the performance analysis that may be conducted after the Java virtual machine 110 is terminated. In an embodiment, the Java virtual machine 110 generates a file to include the symbol information before termination, and then the file is provided to a profiling tool to assist performance analysis.

In the FIG. 1 example, a profiling tool includes a host profiler 160 that runs in the host system 151 and a target profiler 120 that runs in the target system 101. Further, the host system 151 and the target system 101 include suitable interfaces to enable communications, such as TCP/IP based communications, between the two systems. Thus, the host profiler 160 can control the target profiler 120 to start profiling and stop profiling. The target profiler 120 collects profiling data of the Java virtual machine 110 during operation and provides the profiling data to the host profiler 160. The Java virtual machine 110 outputs the symbol information before termination. The symbol information is sent to the host system 151 from the target system 101. The host profiler 160 receives the profiling data and analyzes the profiling data based on the symbol information.

In an embodiment, the host profiler 160 conducts a code cache analysis for the target system 101 and the Java virtual machine 110. In an example, the host system 151 provides a user interface for a user to control profiling.

During operation, in an example, when a user instructs the host system 151 to start profiling, the host profiler 160 sends a start control signal to the target profiler 120 in the target system 101 to start profiling. For example, in response to the start control signal, the target system 101 starts the Java virtual machine 110 to run Java bytecodes of a program. The Java virtual machine 110 is interrupted during operation. The interruptions can be triggered by events, such as cache access (read and/or write) events, and the like, or can be triggered periodically based on a system timer. During interrupt routines, the target profiler 120 samples data needed for code cache profiling, such as hot trace information, cache information, program counter (PC) information, and the like in the Java virtual machine 110. The sampled profiling data is provided to the host system 151.

In addition, the trace symbol collector 140 collects trace symbol information during operation. In an example, when a hot trace is compiled and stored in the JIT code cache 130, the trace symbol collector 140 collects a symbol that denotes a mapping of the hot trace with a memory address in the JIT code cache 130 that stores native codes for the hot trace.

The trace symbol information can be made available out of the Java virtual machine 110 before the Java virtual machine 110 is terminated. In an example, when the user instructs the host system 151 to stop profiling, the host profiler 160 sends a stop control signal to the target profiler 120 in the target system 101 to stop profiling. Further, the Java virtual machine 110 generates a file to include the trace symbol information before its termination. In an example, the file also includes JIT code information in the JIT code cache 130. The file can be sent to the host system 151.

Further, the host profiler 160 conducts code cache performance analysis on the profiling data based on the trace symbol information. In an example, the profiling data includes program counter values sampled periodically. Based on the trace symbol information, the host profiler 160 can identify the hot traces in the JIT code cache 130 corresponding to the program counter values, and can determine statistical profiling for the hot traces, such as percentages of execution time for the hot traces.

According to an embodiment of the disclosure, an existing profiling tool, such as Oprofile, Pixiu, and the like, that is used to profile static compilation can be used to profile just-in-time (JIT) compilation. In an example, the existing profiling tool receives a first file (e.g., with pxd file extension) containing sampled profiling data, and a second file with executable and linkable format (e.g., an ELF file), and conducts performance analysis of the sampled profiling data in the first file based on the second file. In an example, an ELF file is made up of one ELF header, followed by file data. In an example, for static compilation, the ELF file is statically existed and stored in a host system. The host system receives the sampled profiling data and the existing profiling tool conducts performance analysis of the sampled profiling data based on the ELF file.

According to the embodiment of the disclosure, an ELF file can be generated based on the trace symbol information and the JIT code information output from the Java virtual machine 110 before its termination. Then, the existing profiler is used to conduct performance analysis of the sampled profiling data based on the newly generated ELF file.

According to an embodiment of the disclosure, an existing virtual machine may not have the functions of the trace symbol collector 140, and the functions to make the symbol information available out of the virtual machine. The existing virtual machine can be fixed by a software patch. The software patch to the existing virtual machine can add the functions of the trace symbol collector 140 and the functions to make the symbol information available out of the virtual machine.

Figure 2:
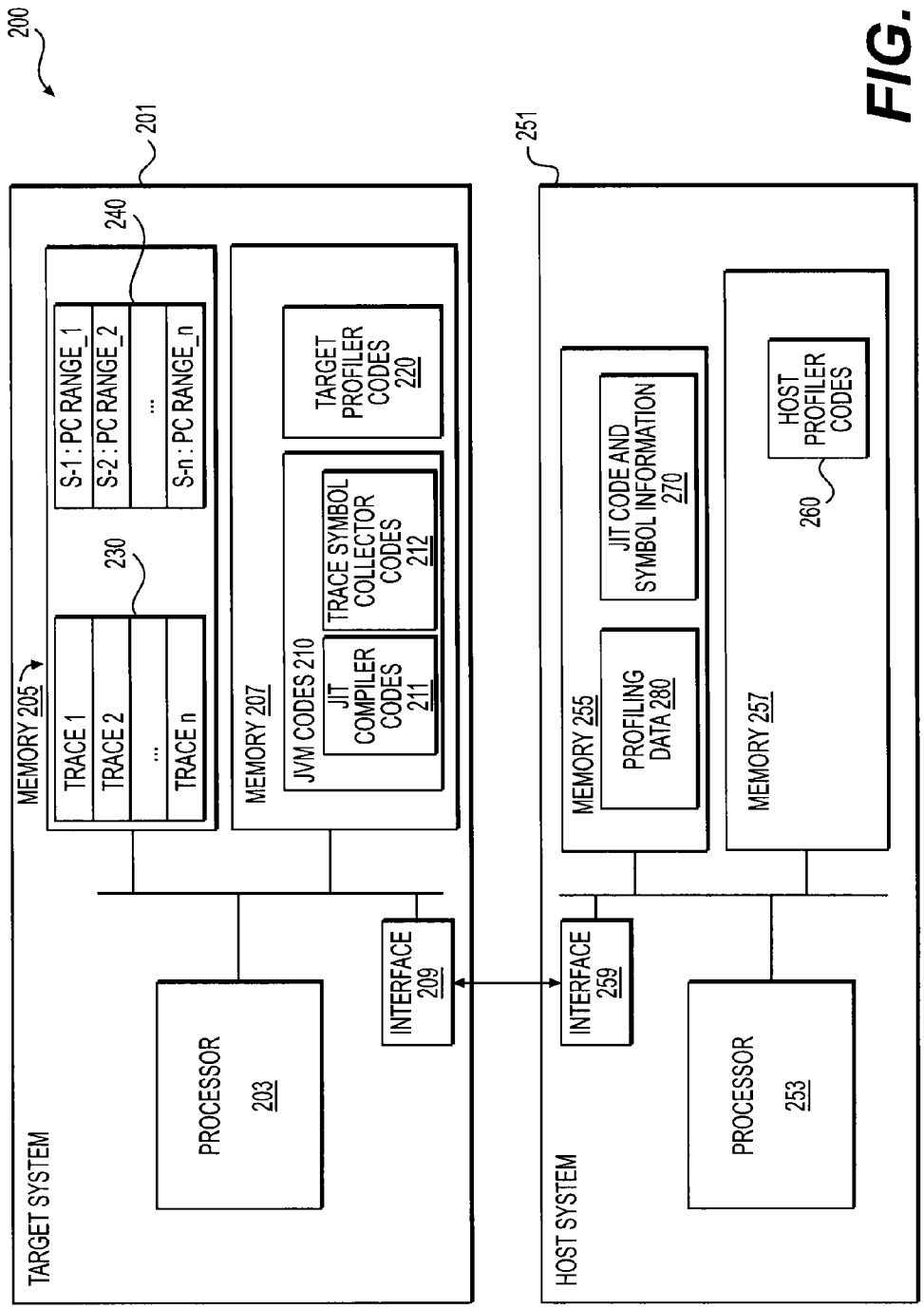
FIG. 2 shows a block diagram of a system 200 configured to use the code performance analysis model 100 according to an embodiment of the disclosure.

FIG. 2 shows a block diagram of a system 200 configured to use the code performance analysis model 100 according to an embodiment of the disclosure. The system 200 includes a target system 201 and a host system 251 coupled together.

The target system 201 includes a processor 203, various memories 205 and 207, and an interface 209 coupled together as shown in FIG. 2. In an example, the target system 201 is implemented on a printed circuit board that has discrete components and various integrated circuit (IC) chips, such as a processor chip, a memory chip, a system-on-chip (SOC), and the like, mounted on the printed circuit board.

The processor 203 can be any suitable processor. In an example, the processor 203 is an ARM processor. According to an embodiment of the disclosure, the memory 207 is a non-volatile memory, such as a read-only memory, a flash memory, a hard disk, and the like. The memory 207 stores various software codes, such as Java virtual machine codes 210, target profiler codes 220, and the like. The Java virtual machine codes 215 include various components, such as JIT compiler codes 215, trace symbol collector codes 240, and the like. In an embodiment, the Java virtual machine 110 in FIG. 1 is implemented as the processor 203 executing the Java virtual machine codes 210, and the target profiler 120 is implemented as the processor 203 executing the target profiler codes 220.

In an embodiment, the memory 205 is a volatile memory, such as static random access memory (SRAM), dynamic random access memory (DRAM), and the like. When the processor 203 executes the Java virtual machine codes 210 to start a Java virtual machine, a memory space 230 in the memory 205 can be allocated for JIT code cache to store compiled native codes of the hot traces, and a memory space 240 in the memory 205 can be allocated to store the collected trace symbol information.

To execute Java bytecodes of a program, the processor 203 executes the Java virtual machine codes 210 to start a Java virtual machine to execute the program. During execution of the program, hot traces are detected, and the Java bytecodes of the hot traces are compiled into native codes. The native codes are stored in the memory space 230. Further, trace symbols for the hot traces are collected and stored in the memory space 240. Before the termination of the Java virtual machine, the trace symbol information in the memory space 240 can be made available out of the Java virtual machine. In an example, the Java virtual machine generates a file to include the trace symbol information. In addition, the file can include the code information in the memory space 230. Then, the file is made available after the Java virtual machine terminates. In an example, the file can be provided to the host system 251.

According to an aspect of the disclosure, the processor 203 is interrupted periodically to sample proofing data. During the interrupt routine, the processor 203 executes the target profiler codes 220 to collect profiling data, such as program counter value, and the like. The profiling data can be provided to the host system 251.

The host system 251 includes a processor 253, various memories 255 and 257, and an interface 259. In an example, the host system 251 is a personal computer. The processor 253 can be any suitable processor. In an example, the processor 253 is an x86 based processor. According to an embodiment of the disclosure, the memory 257 is non-volatile memory. The memory 257 stores host profiler codes 260. The host profiler 160 in FIG. 1 can be implemented as the processor 253 executing the host profiler codes 260.

The interface 259 in the host system 251 can be suitably coupled with the interface 209 in the target system 201 via any wired or wireless connection. Thus, the host system 251 and the target system 201 can communicate via the interfaces 259 and 209. For example, the host system 251 can send control signals to the target system 201, and the target system 201 can send profiling data, and a file including trace symbol information and JIT code information to the host system 251. Then, the processor 253 can execute the host profiler codes 260 to conduct performance analysis on the profiling data based on the trace symbol information and/or the JIT code information.

Figure 3:
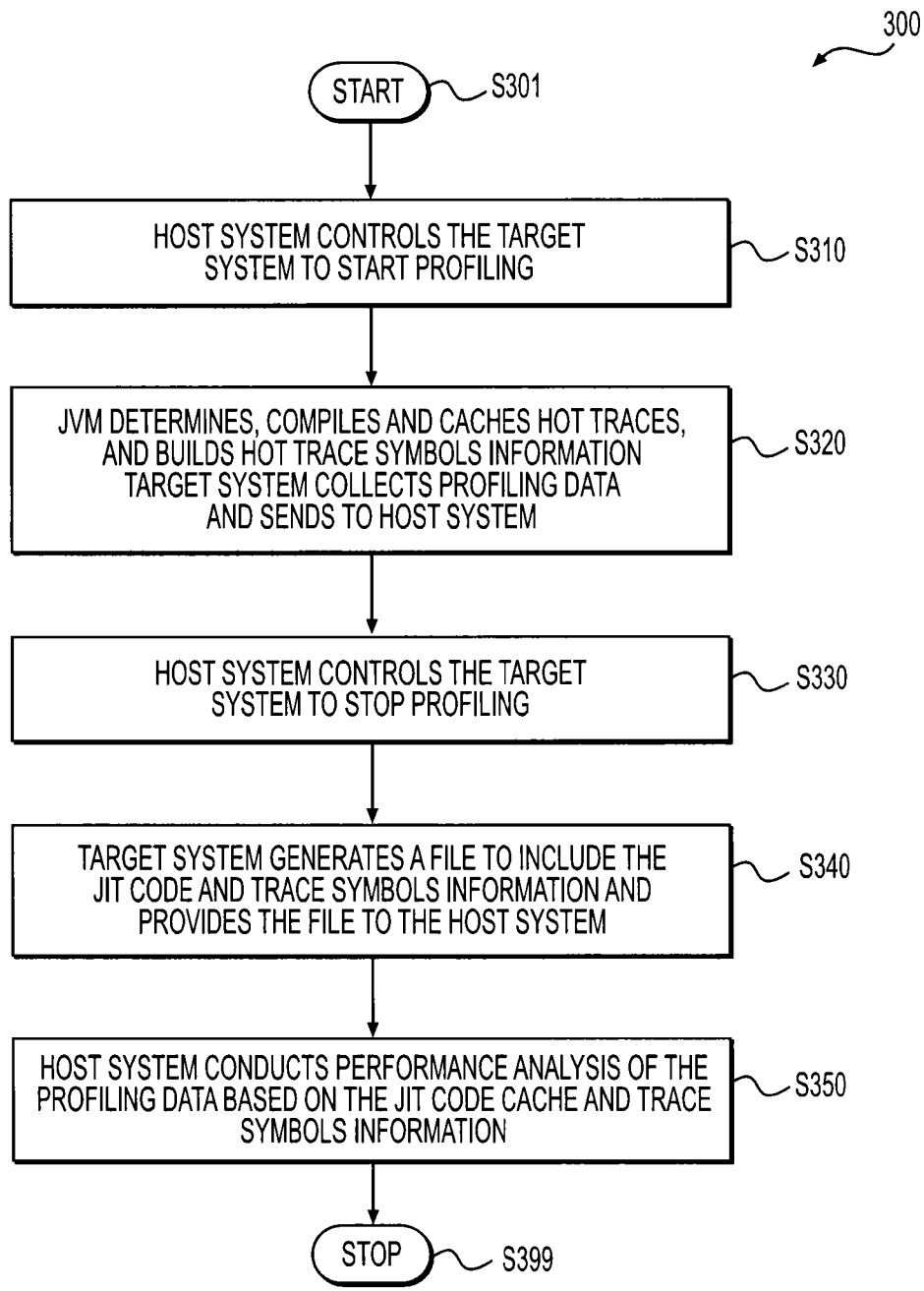
FIG. 3 shows a flow chart outlining a process example 300 according to an embodiment of the disclosure.

FIG. 3 shows a flow chart outlining a process example 300 according to an embodiment of the disclosure. In an example, the process 300 is executed in the performance analysis model 100. The process starts at S301 and proceeds to S310.

At S310, the host system 151 sends a profiling start control signal to the target system 101 to start a code cache profiling for Java virtual machine to execute a program, such as a bench program for profiling. The target system 101 starts the Java virtual machine 110 to execute Java bytecodes of the program.

At S320, during operation, the Java virtual machine 110 detects hot traces in the Java bytecodes. The Java virtual machine 110 includes a JIT compiler that compiles the hot traces into traces of native codes. The traces of native codes are stored in the JIT code cache 130. Further, the symbols of the hot traces are collected and stored in trace symbol collector 140. In addition, the operation of the Java virtual machine 110 is periodically interrupted. During interrupt routine, the target system 101 is sampled to collect profiling data, such as JIT code cache information, program counter value, and the like. The profiling data can be sent to the host system 151.

At S330, the host system 151 sends a profiling stop control signal to the target system 101 to stop the code cache profiling for the Java virtual machine.

At S340, the Java virtual machine 110 generates a file to include JIT code information and the trace symbol information before its termination. The file can be sent to the host system 151. Then the target system 101 terminates the Java virtual machine 110.

At S350, the host system 151 conducts performance analysis of the profiling data based on the JIT code information and trace symbol information. Then, the process proceeds to S399 and terminates.

FIG. 4 shows an example of a file header according to an embodiment of the disclosure. The file header defines "SymbolInfo" type that can be used to map a trace with memory address. The file header can be used in the file generated by the Java virtual machine 110 to include the trace symbol information.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
collecting by circuitry, symbol information to map traces of codes in a program to memory addresses storing corresponding native codes that are dynamically compiled from the traces of codes during an execution of the program; and
making, by the circuitry, the symbol information available after the execution of the program to analyze profiling data sampled during the execution of the program.

2. The method of claim 1, wherein collecting the symbol information to map the traces of codes in the program to the memory addresses storing the corresponding native codes that are dynamically compiled from the traces of codes during the execution of the program further comprises:
collecting the symbol information to map the traces of codes in the program to the memory addresses storing the corresponding native codes that are dynamically compiled from the traces of codes during the execution of the program by a virtual machine operated by the circuitry.

3. The method of claim 1, wherein collecting the symbol information to map the traces of codes in the program to the memory addresses storing the native codes that are dynamically compiled from the traces of codes during the execution of the program further comprises:
detecting that a number of execution for a trace of codes in the program is more than a threshold;
compiling the trace of codes into native codes;
storing the native codes at an address in a cache; and
generating a symbol to map the trace to the address.

4. The method of claim 3, further comprising:
executing the native codes in the cache when the number of execution is larger than the threshold; and
executing the trace of codes by interpretation when the number of execution for the trace is equal or less than the threshold.

5. The method of claim 1, wherein making the symbol information available after the dynamic compilation to analyze the profiling data sampled during the execution of the program comprises:
generating a file to include the symbol information before the execution of the program terminates.

6. The method of claim 5, further comprising:
providing the file to a profiler that analyzes the profiling data sampled during the execution of the program.

7. The method of claim 1, further comprising:
collecting the profiling data during periodic interrupts to the execution of the program.

8. An apparatus comprising:
circuitry implementing a memory configured to store software instructions for a virtual machine; and
the circuitry implementing a processor configured to execute the software instructions to:
start a virtual machine to execute a program; collect symbol information to map traces of codes in the program to memory addresses storing corresponding native codes that are dynamically compiled from the traces of codes during the execution of the program by the virtual machine; and
make the symbol information available after the execution of the program to analyze profiling data sampled during the execution of the program.

9. The apparatus of claim 8, wherein the processor is configured to execute the software instructions to:
detect that a number of execution for a trace of codes in the program is more than a threshold;
compile the trace of codes into native codes; store the native codes at an address in a cache; and generate a symbol to map the trace to the address.

10. The apparatus of claim 9, wherein the processor is configured to:
execute the native codes in the cache when the number of execution is larger than the threshold.

11. The apparatus of claim 10, wherein the trace is a first trace, and the processor is configured to execute a second trace of codes by interpretation when a number of execution for the second trace is equal or less than the threshold.

12. The apparatus of claim 8, wherein the processor is configured to execute the software instructions to generate a file to include the symbol information before the execution of the program terminates.

13. The apparatus of claim 12, wherein the file is provided to a profiler that analyzes the profiling data sampled during the execution of the program.

14. The apparatus of claim 8, wherein:
the memory is configured to store software instructions for a profiler; and
the processor is configured to execute the software instructions for the profiler to collect the profiling data during periodic interrupts to the execution of the program.

15. A non-transitory computer readable medium storing program instructions for causing a processor to execute operations, the operations comprising:
  collecting symbol information to map traces of codes in a program to memory addresses storing corresponding native codes that are dynamically compiled from the traces of codes during an execution of the program; and
  making the symbol information available after the execution of the program to analyze profiling data sampled during the execution of the program.

16. The non-transitory computer readable medium of claim 15, wherein the operations further comprises:
  collecting the symbol information to map the traces of codes in the program to the memory addresses storing the corresponding native codes that are dynamically compiled from the traces of codes during the execution of the program by a virtual machine.

17. The non-transitory computer readable medium of claim 15, wherein the operations further comprises:
  detecting that a number of execution for a trace of codes in the program is more than a threshold;
  compiling the trace of codes into native codes;
  storing the native codes at an address in a cache; and
  generating a symbol to map the trace to the address.

18. The non-transitory computer readable medium of claim 17, wherein the operations further comprises:
  executing the native codes in the cache when the number of execution is larger than the threshold; and
  executing the trace of codes by interpretation when the number of execution for the trace is equal or less than the threshold.

19. The non-transitory computer readable medium of claim 15, wherein the operations further comprises:
  generating a file to include the symbol information before the execution of the program terminates.

20. The non-transitory computer readable medium of claim 19, wherein the operations further comprises:
  providing the file to a profiler that analyzes the profiling data sampled during the execution of the program.

* * * * *